United States Patent
Qian et al.

[11] Patent Number: 6,065,475
[45] Date of Patent: May 23, 2000

[54] AUTOMATIC LOCALIZATION OF THE HEART FROM A RECONSTRUCTED VOLUME AND AUTOMATIC SELECTION OF A MOST SUITABLE REPRESENTATIVE TRANSVERSE SLICE FOR DEFINING A LEFT VENTRICLE OBLIQUE AXIS IN MYOCARDIAL SPECT STUDY

[75] Inventors: Jianzhong Qian; Ming-Yee Chiu, both of Princeton Junction, N.J.

[73] Assignee: Siemens Corporate Research, Inc., Princeton, N.J.

[21] Appl. No.: 08/482,465

[22] Filed: Jun. 8, 1995

[51] Int. Cl.$^7$ ...................................... A61B 5/05
[52] U.S. Cl. ...................... 128/659; 128/653.1; 382/128; 378/20; 250/363.02
[58] Field of Search .................... 128/653.1, 654, 128/659; 382/128; 378/20, 62; 250/363.02, 303.04, 309, 363.1; 364/413.19, 413.22

[56] References Cited

U.S. PATENT DOCUMENTS

| | | |
|---|---|---|
| 4,245,646 | 1/1981 | Ionnou et al. .................. 128/653.1 |
| 4,546,255 | 10/1985 | Knoll et al. .................. 364/413.24 |
| 4,580,219 | 4/1986 | Pelc et al. .................... 364/413.19 |
| 4,812,656 | 3/1989 | Yamakawa et al. .............. 240/363 |
| 5,090,040 | 2/1992 | Lanza et al. .................. 364/413.13 |
| 5,381,791 | 1/1995 | Qian .................... 128/653.1 |
| 5,421,331 | 6/1995 | Devito et al. ................ 128/653.1 |
| 5,423,316 | 6/1995 | Hawman et al. .................. 128/659 |
| 5,429,135 | 7/1995 | Hawman et al. ................ 128/653.1 |
| 5,598,003 | 1/1997 | Jones et al. ................ 250/363.04 |

*Primary Examiner*—Brian L. Casler
*Attorney, Agent, or Firm*—Donald B. Paschburg

[57] ABSTRACT

An automatic selection system utilizes a computer which automatically localizes the heart and automatically selects the most suitable representative slice among a set of transverse slices, which are reconstructed from the myocardial SPECT projection data, for determination of the left ventricular oblique axis in 3-D space. An intensity profile, which consists of maximum counts of each slice and correlates to the radioactivity of the organs in the reconstructed volume, is analyzed. The heart's left ventricle is localized and the representative slice is selected based upon the local and global extrema of such profile.

20 Claims, 7 Drawing Sheets

AUTOMATIC LOCALIZATION OF THE HEART FROM A RECONSTRUCTED VOLUME AND AUTOMATIC SELECTION OF A MOST SUITABLE REPRESENTATIVE TRANSVERSE SLICE FOR DEFINING A LEFT VENTRICLE OBLIQUE AXIS IN MYOCARDIAL SPECT STUDY

BACKGROUND OF THE INVENTION

1. Field of the Invention

The present invention relates to nuclear medicine studies of a patient's heart and more particularly to myocardial perfusion SPECT studies.

2. Description of the Prior Art

In SPECT myocardial perfusion study, a diagnostician examines a nuclear medicine image of a patient's myocardium (heart muscle) to see which areas of the heart take up a radioisotope which is introduced into the patient's bloodstream. If any region of the heart does not take up the radioisotope, that region is not perfused by blood and the tissue in that region is dead. If the region does take up the radioisotope, but not to the same extent as other regions, that region is affected by arteriosclerotic disease.

Myocardial perfusion studies are always carried out on the patient's left ventricle because of the importance of this muscle in pumping blood throughout the body. It is therefore important to identify the precise location of any diseased or dead myocardial tissue within the left ventricle. In order to do so, it is conventional practice to reference the position of a tissue region to the oblique axis of the left ventricle.

One of the critical stages in defining the oblique axis is the localization of the heart from the reconstructed volume and the selection of a most suitable representative slice (MSRS) among all transverse slices along the long axis of the patient's body, either in manual or automatic processing myocardial perfusion SPECT studies. The MSRS is a transverse slice which contains a U shaped left ventricle cross section having the best separation of its two sides of the left ventricle wall. Based upon the MSRS, a center line can be defined such that it bisects the U shaped left ventricle cross section into two approximate equal parts along the long axis of such a cross section. After the center line is defined, the other following stages required to define the oblique axis can be implemented.

At the present time, the localization of the heart and the selection of the MSRS is performed manually according to the technician's subjective judgement. This is a tedious process which requires the user to display a whole set of reconstructed transverse slices on the screen and to visually examine the slices one by one. Thus, even studies conducted on the same patient, by the same technician, may not be exactly comparable with respect to each other. Furthermore, subjective judgement depends on the operator's skill, knowledge and other human factors. Errors, inconsistency, and bias may be introduced, therefore, it would be an advantage if the localization of the heart and the selection of the MSRS could be automated.

U.S. Pat. No. 5,381,791 entitled "Automatic Identification Of Anatomical Features Of Interest From Data Acquired In Nuclear Medicine Studies And Automatic Positioning Of Scintillation Cameras To Carry Out Such Studies At Optimal Positions" describes scanning a nuclear medicine image and identifying and correlating with each other, pixels of maximum and minimum intensity. This information is used to define a region of interest in which an anatomical feature of interest may be located. U.S. Pat. No. 5,421,331 entitled "Automatic Identification Of The Long Axis Of The Left Ventricle From Nuclear Medicine SPECT Data For Use In Myocardial Perfusion Studies" describes identifying and correlating local minima and maxima in images of slices of the left ventricle. The entire disclosures of the above patents are hereby incorporated by reference as if fully set forth.

One object of the present invention is to provide a system that automatically localizes the patient's heart from the reconstructed volume for further processing without the need for any user intervention.

Another object of the present invention is to provide a system for automatically selecting the MSRS among all of the reconstructed transverse slices without the need for any user intervention. The present invention could then be used as one of the key components in automatic myocardial perfusion SPECT processing systems or it could be used as a separate tool by the technician in the manual processing of myocardial perfusion SPECT studies.

SUMMARY OF THE INVENTION

The present invention automatically computer identifies the heart and the most suitable representative slice (MSRS) among reconstructed transverse slices without the need for any user intervention. This identification is based on SPECT projection data acquired by utilizing a scintillation camera and includes processing performed by a computer connected to the camera. The processing derives a smoothed intensity profile based on intensity values of transverse slices. The intensity profile correlates to the radioactivity of the organs in the reconstructed volume. Analysis of this smoothed intensity profile provides the range of the heart and the MSRS.

DETAILED DESCRIPTION OF THE INVENTION

Figure 1:
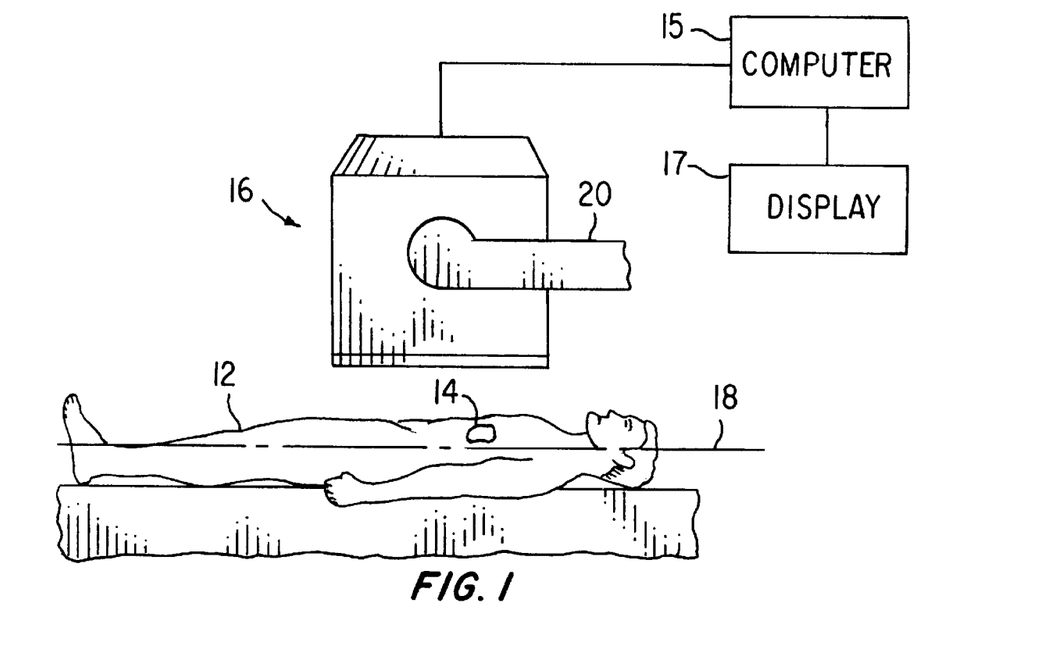
FIG. 1 illustrates an overall schematic diagram of a SPECT scintillation camera system in accordance with the present invention.

FIG. 1 illustrates a diagram of a SPECT (Single Photon Emission Computed Tomography) scintillation camera system in accordance with the present invention. In a conventional SPECT scintillation camera system, a nuclear medicine SPECT study is conducted upon a patient 12 and a target organ, such as a heart 14 of the patient 12 is imaged using a scintillation camera 16. During the study, the camera 16 is rotated around the axis 18 of the patient 12 by a gantry 20. A frame of planar image data is acquired at each of a plurality of camera stops which are regularly spaced around the patient. The planar image data collected by the camera 16 is routed to a computer 15. Conventional SPECT reconstruction software is adapted to reconstruct three dimensional images along the axis 18. Images of the patient 12 may be displayed on a display 17.

Figure 2:
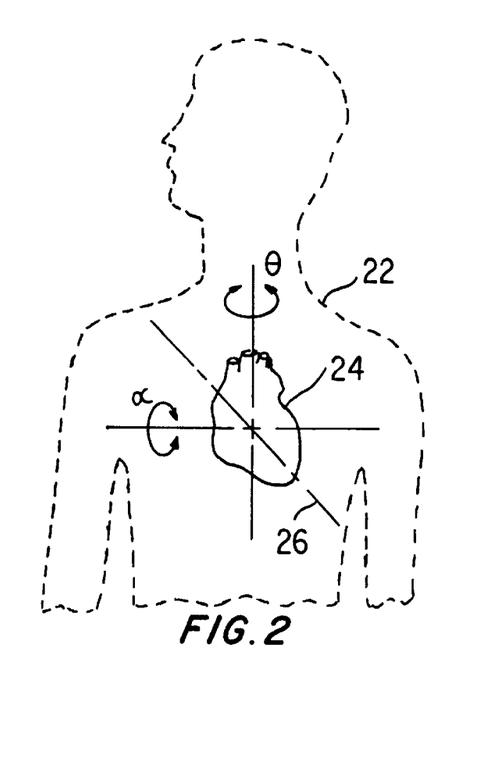
FIG. 2 illustrates the orientation of the heart with respect to the axis of the body of a patient.

FIG. 2 illustrates the patient 22 and the patient's heart 24. The ventricle of the patient's heart 24 has a long axis 26 which is at an angle θ with respect to the horizontal and at an angle α with respect to the vertical. Consequently, a natural coordinate system for viewing the anatomy of the heart is where θ is equal to zero degrees and where α is equal to zero degrees. Typically, the technician transforms the projection of the SPECT data so that the acquired SPECT data is viewed from such a natural coordinate system. The reorientation of the tomography data to produce oblique transverse views of the heart makes it possible to use the already existing and clinically tested reconstruction software designed for backprojecting images in the plane of rotation of the camera.

Figure 3:
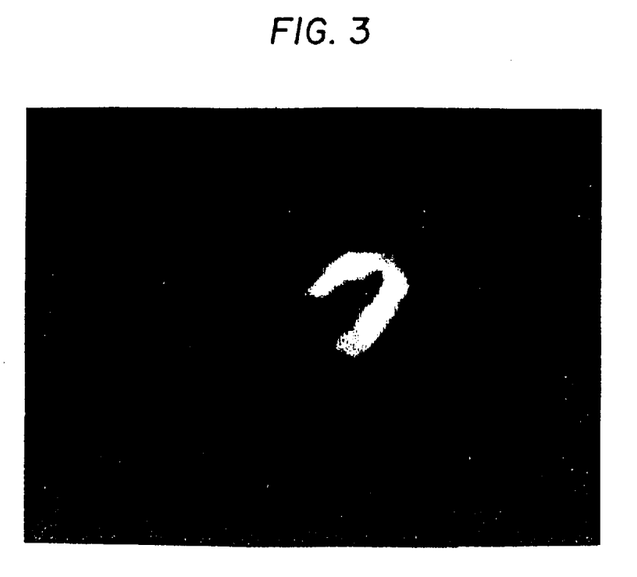
FIG. 3 illustrates a typical nuclear medicine image of a transverse slice of a patient's left ventricle.

The angles θ and α are different for each patient and are not known in advance, therefore, a technician, with the prior art technique, is required to devote substantial time in operating the equipment. To determine the angles θ and α, the technician displays images of slices of the left ventricle on the display 17 and then manually inputs a first axis that identifies the plane in which the axis 26 exists and a second axis which locates the axis 26 within that plane. This transverse slice, which is displayed on the display 17 of FIG. 1, is illustrated in FIG. 3. The technician is then required to input with a mouse, etc . . . , an assumed reorientation axis which is adjusted to accurately bisect the left ventricle through the apex. The direction of the reorientation axis establishes angle α and therefore limits the possible location of the axis 26 to somewhere within a plane.

Figure 4:
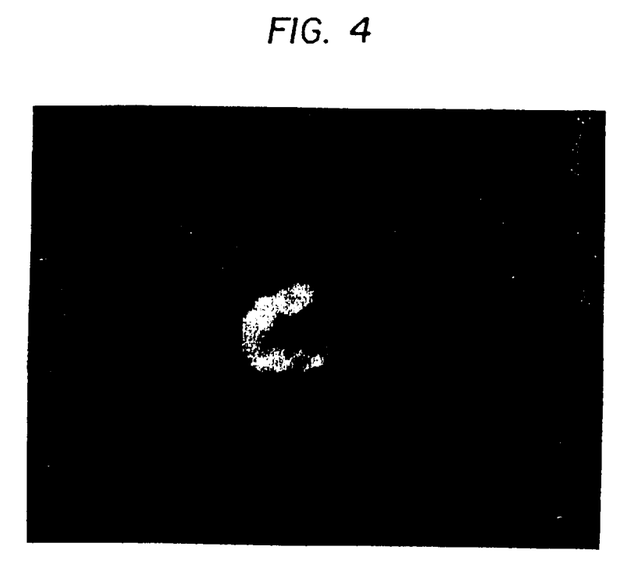
FIG. 4 illustrates a typical oblique sagittal slice of a patient's left ventricle.

Once the reorientation axis has been provided, a slice perpendicular to the axis projection and passing through the axis of the left ventricle is reconstructed from the SPECT data along the reorientation axis and displayed on the display. This produces a U-shaped image as illustrated in FIG. 4. Once again, the technician inputs with a mouse, etc . . . , the assumed axis 26 which is adjusted to accurately bisect the left ventricle through the apex. The direction of the axis 26 establishes the angle θ.

Once the angles θ and α are known, it is possible for the computer to reorient the heart as described above and to produce oblique slices of the left ventricle by reslicing SPECT data along the reoriented axis which now lies along the axis 26. Oblique means that the slice is normal to the axis 26 which is oblique to the body axis 18. By displaying one such slice after another the accuracy of the identification of the axis 26 can be checked. The center of the slices will coincide if the axis 26 has been properly chosen. If the axis 26 has not been properly chosen, the centers of the slices of the left ventricular chamber will not coincide and it will be necessary to iterate the above procedures to reach the desired degree of accuracy.

The present invention eliminates the inaccuracies and inefficiencies of above by automatically localizing the heart and selecting the most suitable representative slice. The computer 15 of FIG. 1 is used to reconstruct a set of transverse slices of the left ventricle from the projection data. The reconstruction process is known in the art and is discussed in U.S. Pat. No. 5,381,791 and U.S. Pat. No. 5,421,331, discussed in the Description of the Prior Art and hereby incorporated by reference as if fully set forth.

From this set of transverse slices of the left ventricle, a representative slice is automatically selected by using the computer 15. This selection process is carried out by using the anatomical fact that in each transverse slice, the ventricle is a U-shaped anatomical region. The representative slice is chosen by identifying that slice in which the U-shaped anatomical region has the greatest size.

Figure 5:
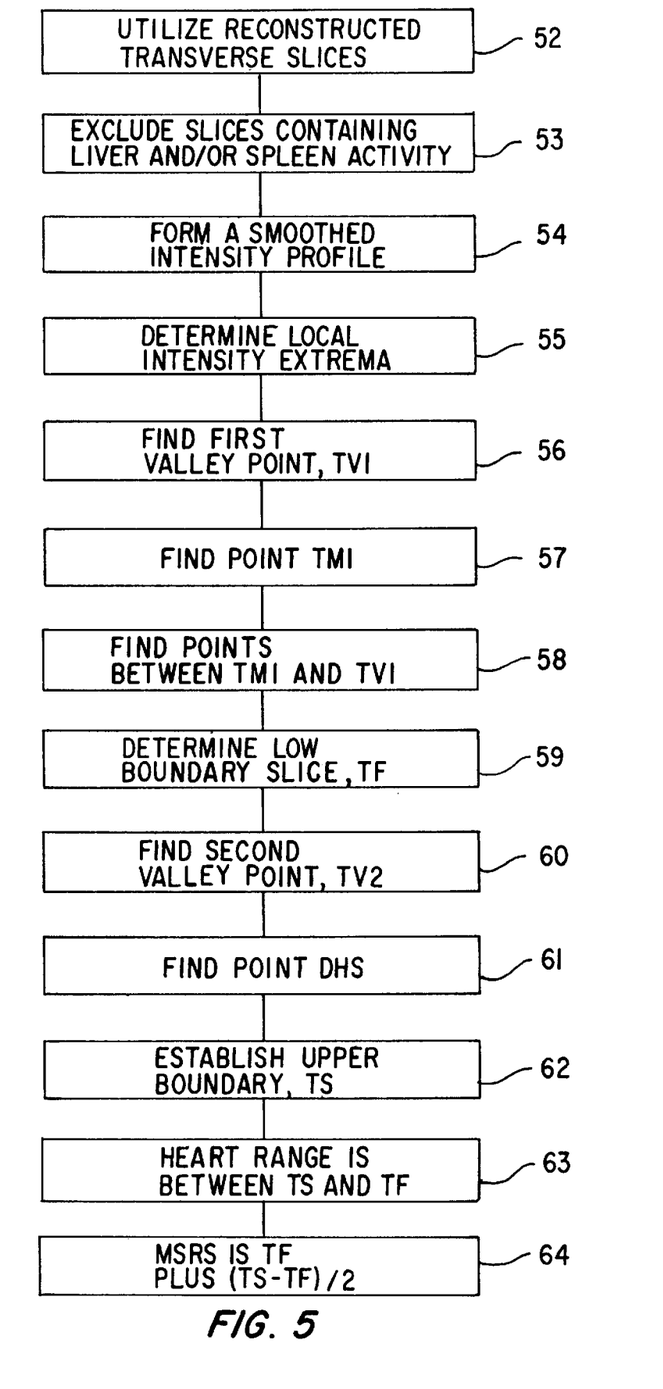
FIG. 5 illustrates a flow diagram of one embodiment of the processing of the present invention.
Figure 6:
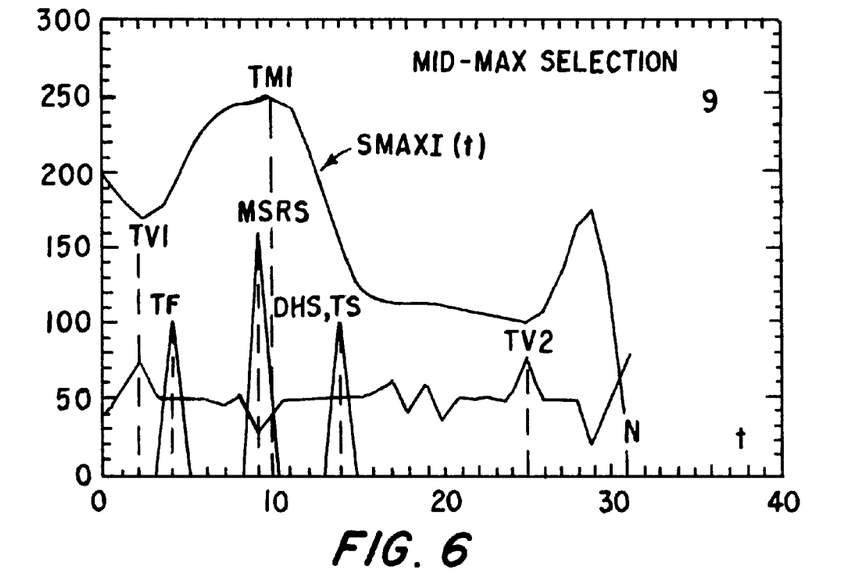
FIGS. 6 through 12 illustrate heart range localization and MSRS selection of the present invention from patients having various heart range activity curve profiles.
Figure 7:
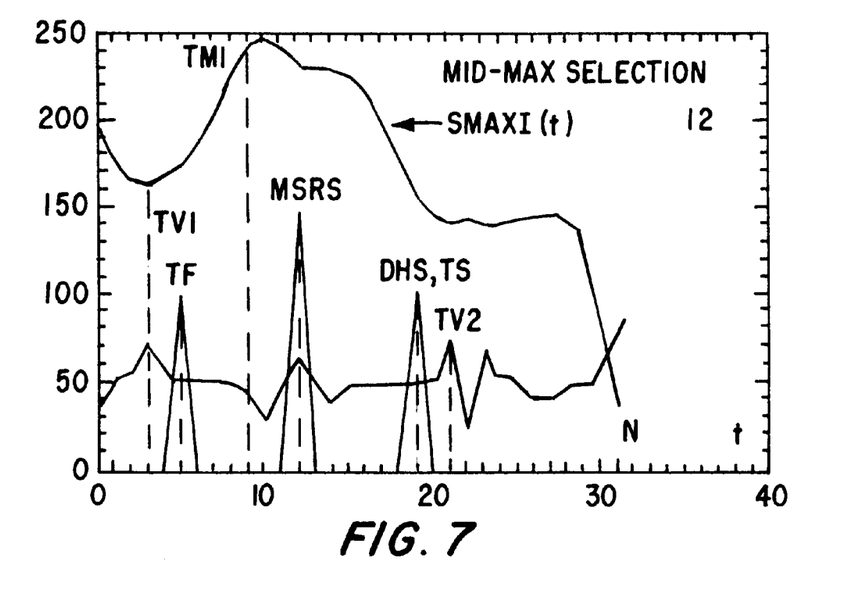
Figure 8:
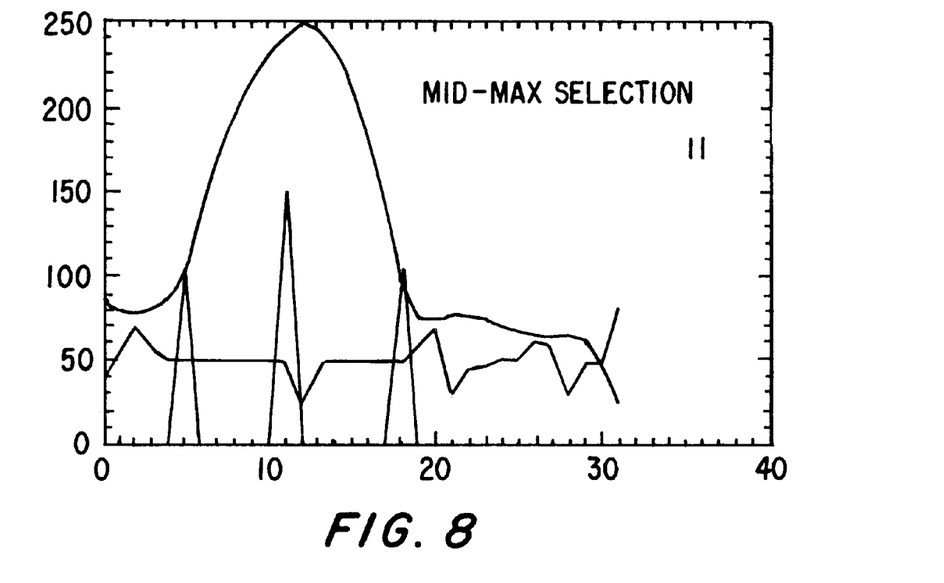
Figure 9:
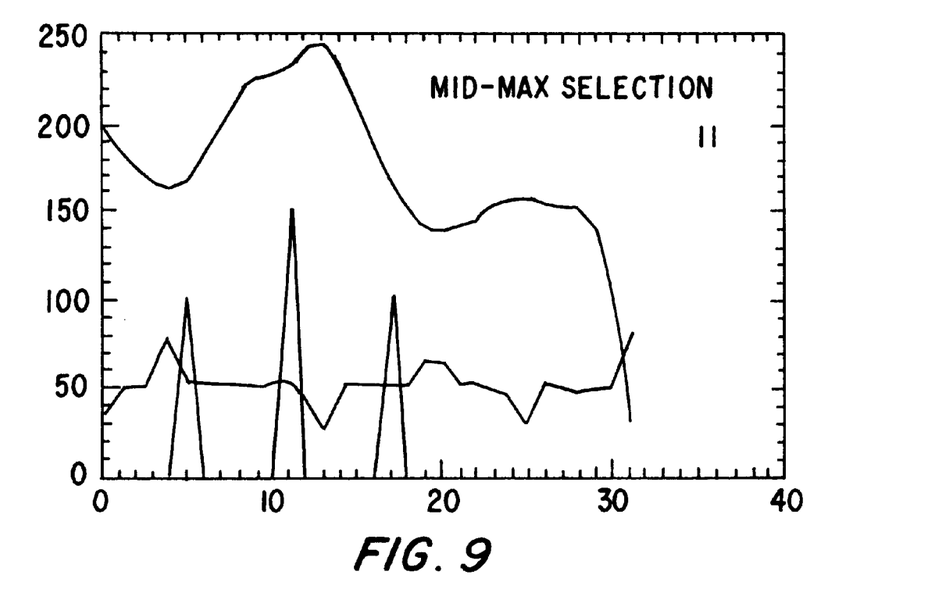
Figure 10:
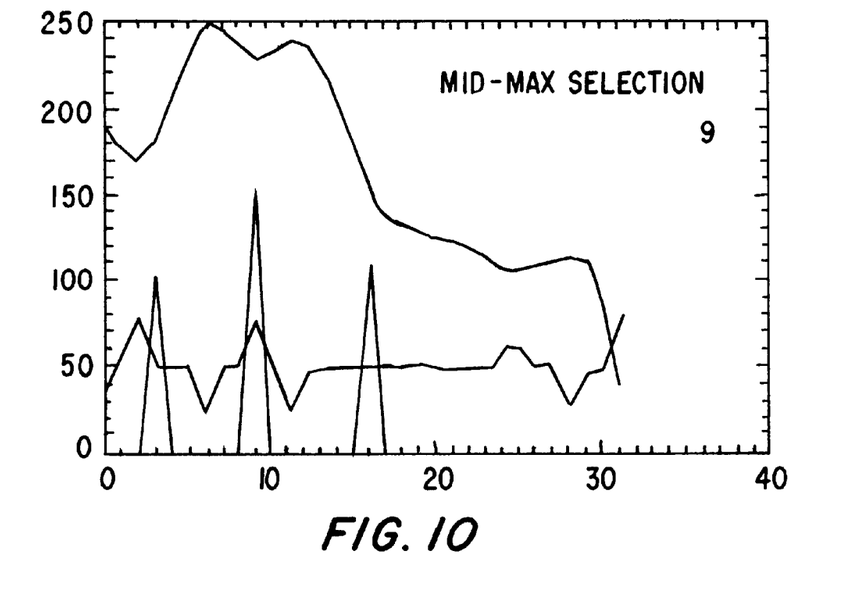
Figure 11:
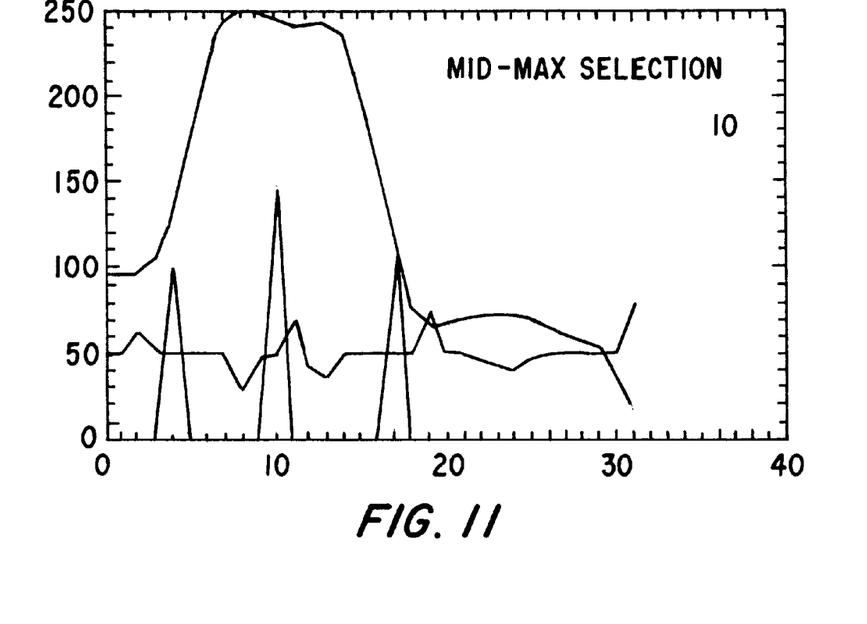
Figure 12:
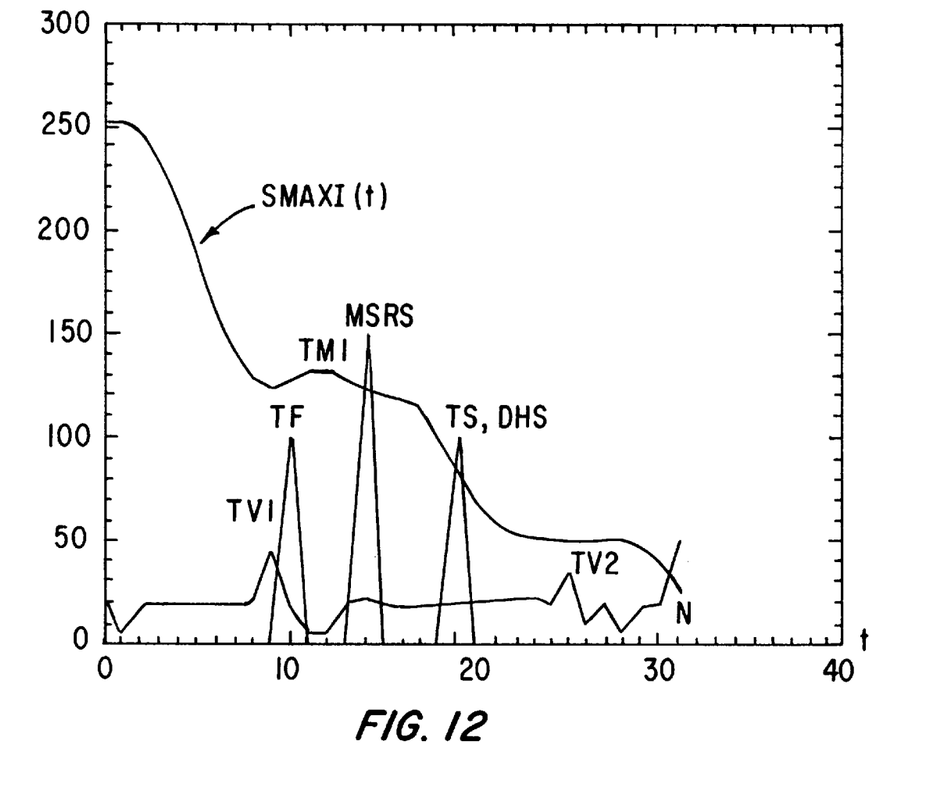

A flow diagram of the present invention is illustrated in FIG. 5. Initially, as shown in box 52, the present invention utilizes the reconstructed transverse slices discussed above. In box 53, the slices containing liver activities and/or spleen activities are excluded or partially excluded. This exclusion is performed by using the methods disclosed in the above-referenced patent. The computer, in box 54, then forms an N-point one dimensional intensity profile MAXI(t) by taking the maximum intensity value, or the average of a few of the highest intensity values, from each transverse slice along the body axis 18 of FIG. 1 (where t=1,2, . . . , N are the number of transverse slices along the patient's body axis arranged bottom-up). The one dimensional intensity profile is smoothed by taking $$SMAXI(t)=(MAXI(t-1)+MAXI(t)+MAXI(t+1))/3$$

In box 55, the computer determines all local intensity extrema by calculating the curvature extrema along the smoothed intensity profile, SMAXI(t). The computer in box 56 then finds the first valley point, indicating the division of radioactivities of the liver and the heart. This valley point, SMAXI(TV1), lies along the profile SMAXI located at TV1 on the t axis. In box 57, the computer then finds a point TM1 having a maximum intensity value on the profile between the point TV1 and the point at (N−TV1)/2 on the t axis. According to their intensity differences, IDIF, in box 58, the computer finds all candidate points between TM1 and TV1 on the t axis for the possible low boundary of the transverse slices containing heart activities. This is done by finding the points between TV1 and TV1+N/5 (using 5 as an example) on the t axis such that the difference between the intensity of the point and that of TV1 is significantly less than IDIF, for example, IDIF/4. In box 59, the low boundary slice, TF, is determined by selecting the right most point, the maximum t value, among the above qualified points between TV1 and TV1+N/5. The slice number, TF, is the lower boundary for transverse slices containing the heart left ventricle activities. Box 60 shows that the second valley point, SMAXI(TV2), is found by starting from TF+N/4 (using 4 as an example), such that the difference between the intensity of TM1 and the intensity of TV2 is greater than one third of the intensity of TM1. The point, DHS, is found in box 61 by starting at the point TF+N/4 on the t axis, such that the intensity of DHS is significantly less than the intensity of TV1. In box 62, TS=minimum(TV2, DHS) is taken as the upper boundary of transverse slices having heart left ventricle activities. In box 63, the patient's heart is localized at the range between the slice TS and TF in the reconstructed three dimensional volume along the body axis. The flow diagram of the present invention concludes with box 64 where the MSRS is determined by TF plus the integer value of (TS−TF)/2.

FIGS. 6 through 12 illustrate heart range localization and MSRS selection of the present invention from patients having varying heart range activity profiles. The vertical axis defines intensity values and the horizontal axis defines the number of transverse slices, t, along the patient's body axis. The top curve, SMAXI(t) is the smoothed one dimensional intensity profile formed as follows. The maximum intensity value, or the average of a few of the highest intensity values, from each transverse slice along the body axis 18 of FIG. 1 are recorded. A one dimensional intensity profile, MAXI(t), is formed based on the highest intensity values where t=1,2, . . . , N are the number of transverse slices along the patient's body axis arranged bottom-up. The one dimensional intensity profile is smoothed by taking the following.

$$SMAXI(t)=(MAXI(t-1)+MAXI(t)+MAXI(t+1))/3$$

The lower curve is the curvature extrema of the top curve. The point TV1 on the t axis points to the first valley point along the profile SMAXI. The point TM1 on the t axis points to the maximum intensity value on the profile between the point TV1 and the point (N−TV1)/2 on the t axis. The slice number, TF, is determined as follows. The points between TV1 and TV1+N/5 (using 5 as an example) on the t axis are recorded such that the difference between the intensity of the point and that of TV1 is significantly less than IDIF. IDIF is the intensity difference between TM1 and TV1. The maximum t value among these recorded points is TF. The point TV2 on the t axis, which points to the second valley point along the profile SMAXI, is found by starting at TF+N/4 (using 4 as an example) and locating a point where the difference between the intensity of TM1 and the intensity of TM1 of TV2 is greater than one third of the intensity of TM1. The point DHS is located by starting at the point TF+N/4 and finding the point DHS on the t axis such that the intensity of DHS is significantly less than the intensity value of TV1. The upper boundary for the transverse slice containing the heart left ventricle activities is located at TS=min (TV2, DHS). The patient's heart is located at the range between the left most triangle, TF, and the right most triangle, TS, in the reconstructed three dimensional volume. The MSRS is located at the middle triangle and is determined by TF plus the integer value of (TS−TF)/2.

The present invention improves the diagnostic accuracy, consistency, and clinical throughput in processing myocardial perfusion SPECT studies. Therefore, it improves on known nuclear medicine equipment and methodology.

It is not intended that the present invention be limited to the hardware or software arrangement, or operational procedures shown disclosed. This invention includes all of the alterations and variations thereto as encompassed within the scope of the claims as follows.

We claim:

1. A system for automatically localizing a heart from a reconstructed three dimensional image volume and for automatically selecting a most suitable representative transverse slice comprising:
    scintillation camera means for acquiring and storing a nuclear medicine image of said heart; and,
    computer means connected to said scintillation camera means for analyzing said nuclear medicine image by deriving a single one dimensional maximum intensity profile by taking a maximum value of each transverse image in said reconstructed three dimensional image volume without using one of an additional scan curve and a specific scan direction and by establishing local and global intensity extrema of said one dimensional maximum intensity profile without using additional intensity profiles and grouping any additional line features.

2. A system for automatically localizing a heart from a reconstructed three dimensional image volume and for automatically selecting a most suitable representative transverse slice as claimed in claim 1 wherein said computer means comprises:
    utilization means for utilizing reconstructed transverse slices;
    forming means for forming a smoothed one dimensional maximum intensity profile by taking one of one maximum intensity value and an average of several of highest intensity values from each transverse slice along a body axis in said reconstructed three dimensional image volume;
    determination means for determining all local intensity extrema by calculating curvature extrema along said smoothed one dimensional maximum intensity profile; and
    localizing means for analyzing said smoothed one dimensional maximum intensity profile wherein said heart is localized in the reconstructed three dimensional image volume and wherein the most suitable representative transverse slice is located.

3. A system for automatically localizing a heart from a reconstructed three dimensional image volume and for automatically selecting a most suitable representative transverse slice as claimed in claim 2 wherein said computer means further comprises:
    exclusion means for excluding reconstructed transverse slices containing activities of a liver and/or spleen.

4. A system for automatically localizing a heart from a reconstructed three dimensional image volume and for automatically selecting a most suitable representative transverse slice as claimed in claim 2 wherein said forming means comprises:
    taking means for taking a maximum intensity value; and, calculation means for calculating $$SMAXI(t)=(MAXI(t-1)+MAXI(t)+MAXI(t+1))/3$$

where t=1,2, . . . , N are number of transverse slices along patient's body axis.

5. A system for automatically localizing a heart from a reconstructed three dimensional image volume and for automatically selecting a most suitable representative transverse slice as claimed in claim 2 further comprising:
    display means connected to said computer means for displaying said most suitable representative transverse slice.

6. A system for automatically localizing a heart from a reconstructed three dimensional image volume and for automatically selecting a most suitable representative transverse slice comprising:
    scintillation camera means for acquiring and storing a nuclear medicine image of said heart; and,
    computer means connected to said scintillation camera means for analyzing said nuclear medicine image by deriving a single one dimensional maximum intensity profile and by establishing local and global intensity extrema of said one dimensional maximum intensity profile;
    wherein said computer means comprises
        utilization means for utilizing reconstructed transverse slices;
        forming means for forming a smoothed one dimensional maximum intensity profile by taking one of one maximum intensity value and an average of several of highest intensity values from each transverse slice along a body axis in said reconstructed three dimensional image volume;
        determination means for determining all local intensity extrema by calculating curvature extrema along said smoothed one dimensional maximum intensity profile; and
        localizing means for analyzing said smoothed one dimensional maximum intensity profile wherein said heart is localized in the reconstructed three dimensional image volume and wherein the most suitable representative transverse slice is located;

wherein said localizing means comprises:

first location means for locating a point, TV1, pointing to a first valley point, SMAXI(TV1), which indicates division of radioactivities of a liver and said heart;

second location means for locating a point, TM1, having a maximum intensity value on said single one dimensional maximum intensity profile between point TV1 and point (N−TV1)/2;

third location means for locating all candidate points between TM1 and TV1 according to their intensity differences, IDIF;

fourth location means for locating a low boundary of transverse slices, TF;

fifth location means for locating a point, TV2, pointing to a second valley point, SMAXI(TV2);

sixth location means for locating a point DHS; and, establishing means for establishing upper boundary of transverse slices, TS, having heart left ventricle activities;

wherein said heart is localized between said slice TS and said slice TF in the reconstructed three dimensional image volume and wherein the most suitable representative transverse slice is located at TF plus (TS−TF)/2.

7. A system for automatically localizing a heart from a reconstructed three dimensional image volume and for automatically selecting a most suitable representative transverse slice as claimed in claim 6 wherein said third location means comprises:

means for locating points between TV1 and TV1+N/5 on t axis such that a difference between a value of SMAXI at each of said points and a value of SMAXI(TV1) is significantly less than IDIF.

8. A system for automatically localizing a heart from a reconstructed three dimensional image volume and for automatically selecting a most suitable representative transverse slice as claimed in claim 7 wherein said fourth location means comprises:

means for locating TF by selecting a right most point, along t axis, among said points between TV1 and TV1+N/5.

9. A system for automatically localizing a heart from a reconstructed three dimensional image volume and for automatically selecting a most suitable representative transverse slice as claimed in claim 8 wherein said fifth location means comprises:

means for locating TV2 by starting from TF+N/4, such that difference between a value of SMAXI(TM1) and a value of SMAXI(TV2) is greater than one third of said value of SMAXI(TM1).

10. A system for automatically localizing a heart from a reconstructed three dimensional image volume and for automatically selecting a most suitable representative transverse slice as claimed in claim 9 wherein said sixth location means comprises:

means for locating DHS by starting at point TF+N/4 on said t axis, such that intensity of DHS is significantly less than intensity of TV1.

11. A system for automatically localizing a heart from a reconstructed three dimensional image volume and for automatically selecting a most suitable representative transverse slice as claimed in claim 10 wherein said establishing means comprises:

calculating means for calculating TS=minimum(TV2, DHS).

12. A method for automatically localizing a heart from a reconstructed three dimensional image volume and for automatically selecting a most suitable representative transverse slice comprising the steps of:

acquiring and storing a nuclear medicine image of said heart; and, analyzing said nuclear medicine image to automatically localize said heart and automatically select said most suitable representative transverse slice by deriving a single one dimensional maximum intensity profile by taking a maximum value of each transverse image in said reconstructed three dimensional image volume without using one of an additional scan curve and a specific scan direction and by establishing local and global extrema of said one dimensional maximum intensity profile without using additional intensity profiles and grouping any additional line features.

13. A method for automatically localizing a heart from a reconstructed three dimensional image volume and for automatically selecting a most suitable representative transverse slice as claimed in claim 12 wherein analyzing said nuclear medicine image comprises the steps of:

reconstructing transverse slices;

utilizing said reconstructed transverse slices;

forming a smoothed one dimensional maximum intensity profile by taking one maximum intensity value or an average of several of highest intensity values from each transverse slice alone a body axis in said reconstructed three dimensional image volume;

determining all local and global intensity extrema by calculating curvature extrema along said smoothed one dimensional maximum intensity profile; and, analyzing said local and global intensity extrema;

wherein said heart is localized in the reconstructed three dimensional volume and wherein the most suitable representative transverse slice is located.

14. A method for automatically localizing a heart from a reconstructed three dimensional image volume and for automatically selecting a most suitable representative transverse slice comprising the steps of acquiring and storing a nuclear medicine image of said heart; and, analyzing said nuclear medicine image to automatically localize said heart and automatically select said most suitable representative transverse slice by deriving a single one dimensional maximum intensity profile by taking a maximum value of each transverse image in said reconstructed three dimensional image volume without using one of an additional scan curve and a specific scan direction and by establishing local and global extrema of said one dimensional maximum intensity profile without using additional intensity profiles and grouping any additional line features;

wherein analyzing said nuclear medicine image comprises the steps of:

reconstructing transverse slices;

utilizing said reconstructed transverse slices;

forming a smoothed one dimensional maximum intensity profile by taking one of one maximum intensity value and an average of several of highest intensity values from each transverse slice along a body axis in said reconstructed three dimensional image volume;

wherein analyzing said local and global intensity extrema comprises the steps of:

locating a point, TV1, pointing to a first valley point, SMAXI(TV1), which indicates division of radioactivities of a liver and said heart;

locating a point, TM1, having a maximum intensity value on said single one dimensional maximum intensity profile between point TV1 and point (N−TV1)/2;

locating all candidate points between TM1 and TV1 according to their intensity differences, IDIF;

locating a low boundary of transverse slices, TF;

locating a point, TV2, pointing to a second valley point, SMAXI(TV2);

locating a point DHS; and, establishing upper boundary of transverse slices, TS, having heart left ventricle activities;

wherein said heart is localized between said slice TS and said slice TF in the reconstructed three dimensional image volume and wherein the most suitable representative transverse slice is located at TF plus (TS−TF)/2.

15. A method for automatically localizing a heart from a reconstructed three dimensional image volume and for automatically selecting a most suitable representative transverse slice as claimed in claim 14 wherein analyzing said nuclear medicine image further comprises the step of:

partially excluding reconstructed transverse slices containing activities of a liver and/or spleen.

16. A method for automatically localizing a heart from a reconstructed three dimensional image volume and for automatically selecting a most suitable representative transverse slice as claimed in claim 15 wherein forming a smoothed one dimensional maximum intensity profile comprises the steps of:

taking a maximum intensity value; and, calculating $$SMAXI(t)=(MAXI(t-1)+MAXI(t)+MAXI(t+1))/3$$

where $t=1,2,\ldots,N$ are number of transverse slices along patient's body axis.

17. A system for automatically localizing a heart from a reconstructed three dimensional image volume and for automatically selecting a most suitable representative transverse slice comprising:

scintillation camera means for acquiring and storing a nuclear medicine image of said heart; and, computer means connected to said scintillation camera means for analyzing said reconstructed three dimensional image volume wherein said computer means comprises:

utilization means for utilizing reconstructed transverse slices;

forming means for forming a smoothed one dimensional maximum intensity profile by taking one of one maximum intensity value and an average of several of highest intensity values from each transverse slice along a body axis in said reconstructed three dimensional image volume;

determination means for determining all local intensity extrema by calculating curvature extrema along said smoothed one dimensional maximum intensity profile; and, localizing means for analyzing said smoothed one dimensional maximum intensity profile wherein said heart is localized in the reconstructed three dimensional image volume and wherein the most suitable representative transverse slice is located.

18. A system for automatically localizing a heart from a reconstructed three dimensional image volume and for automatically selecting a most suitable representative transverse slice as claimed in claim 17 wherein said computer means further comprises:

exclusion means for partially excluding reconstructed transverse slices containing activities of a liver and/or spleen.

19. A system for automatically localizing a heart from a reconstructed three dimensional image volume and for automatically selecting a most suitable representative transverse slice as claimed in claim 18 wherein said forming means comprises:

taking means for taking an average of highest intensity values; and, calculation means for calculating $$SMAXI(t)=(MAXI(t-1)+MAXI(t)+MAXI(t+1))/3$$

where $t=1,2,\ldots,N$ are number of transverse slices along patient's body axis.

20. A system for automatically localizing a heart from a reconstructed three dimensional image volume and for automatically selecting a most suitable representative transverse slice as claimed in claim 19 further comprising:

display means connected to said computer means for displaying said most suitable representative transverse slice.

* * * * *